United States Patent
D'Aquino et al.

(10) Patent No.: US 7,150,561 B1
(45) Date of Patent: Dec. 19, 2006

(54) ZERO TEMPERATURE COEFFICIENT (TC) CURRENT SOURCE FOR DIODE MEASUREMENT

(75) Inventors: Dan D'Aquino, Sunnyvale, CA (US); Mehmet Aslan, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 32 days.

(21) Appl. No.: 10/943,131

(22) Filed: Sep. 16, 2004

(51) Int. Cl.
*G01K 7/00* (2006.01)

(52) U.S. Cl. ........................... 374/178; 327/512
(58) Field of Classification Search ............... 374/178, 374/170, 171, 172, 173
See application file for complete search history.

(56) References Cited

U.S. PATENT DOCUMENTS

| | | | | |
|---|---|---|---|---|
| 4,047,435 A | * | 9/1977 | Keith | 374/178 |
| 4,114,053 A | * | 9/1978 | Turner | 327/513 |
| 4,350,904 A | * | 9/1982 | Cordell | 327/513 |
| 4,673,867 A | * | 6/1987 | Davis | 323/315 |
| 5,077,491 A | * | 12/1991 | Heck et al. | 327/83 |
| 5,334,929 A | * | 8/1994 | Schade, Jr. | 323/315 |
| 5,666,046 A | * | 9/1997 | Mietus | 323/313 |
| 6,149,299 A | * | 11/2000 | Aslan et al. | 374/178 |
| 6,483,372 B1 | * | 11/2002 | Bowers | 327/513 |
| 6,869,216 B1 | * | 3/2005 | Holloway et al. | 374/170 |
| 6,957,910 B1 | * | 10/2005 | Wan et al. | 374/183 |
| 2002/0050811 A1 | * | 5/2002 | Serratoni | 323/311 |

* cited by examiner

*Primary Examiner*—Gail Verbitsky
*Assistant Examiner*—Mirellys Jagan
(74) *Attorney, Agent, or Firm*—Darby & Darby, P.C.; Matthew M. Gaffney

(57) ABSTRACT

A method and circuit for reducing a temperature dependent error in p-n junction based temperature measurements. The temperature-dependent error may be caused by parasitic resistance in a p-n junction and temperature dependent variation of a bias current in a temperature sensor. A difference in base-emitter voltage of a sensing transistor is employed to determine a temperature of a source device. In one embodiment, a zero Temperature Coefficient (TC) current source employing a temperature dependent variation of a current generates by an emitter-base voltage across a resistor between the emitter and the base of a junction transistor is used to counter balance a Proportional To Absolute Temperature (PTAT) current source.

14 Claims, 4 Drawing Sheets

US 7,150,561 B1

ZERO TEMPERATURE COEFFICIENT (TC) CURRENT SOURCE FOR DIODE MEASUREMENT

FIELD OF THE INVENTION

The present invention relates to remote diode sensing, and in particular, to a method and circuit for compensating for a temperature dependent error of measurement voltage due to a resistance in a measurement path.

BACKGROUND

Temperature sensors are often used in the semiconductor industry to monitor operating temperatures of devices fabricated on integrated circuit chips. Typically, an actual sensor and associated sensing circuitry are fabricated on a separate chip from that which contains the device, whose temperature is being monitored. A sensor chip is then placed close to a chip containing a device of interest. This means that in reality, the temperature sensor is measuring a temperature of the local environment of the device of interest, not its actual temperature.

One type of temperature sensor includes a semiconductor device such as a p-n junction. The p-n junction conducts a current when forward biased. The p-n junction has an associated voltage drop that is determined by the forward bias current and the temperature of the p-n junction. Voltage drops across the p-n junction are measured for two different forward bias currents. An analog-to-digital converter (ADC) may be employed to convert the voltage drops across the p-n junction to digital data. The digital data is recorded and analyzed to determine the temperature of the p-n junction.

Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment or an embodiment combining software and hardware aspects. The following detailed description is, therefore, not to be taken in a limiting sense.

Briefly stated, the present invention is directed to reducing a temperature dependent measurement error. The temperature dependent error may be produced due to resistance in a p-n junction of the temperature sensor and a temperature dependent source current, and affect a measurement by the sensor relying on temperature dependent changes in a junction voltage. Commonly, a difference in base-emitter voltage of a sensing transistor is employed to determine a temperature of a source device. However, a temperature dependent variation in source current may introduce a an error factor that may increase with temperature into the measurement because of a voltage difference resulting from the source current flowing through a resistance in measurement path.

According to one embodiment of the present invention, a zero TC current source may be implemented to provide a junction current to the temperature sensor substantially reducing the temperature dependent error factor. The zero TC current source may comprise a current mirror and a Proportional To Absolute Temperature (PTAT) current source that is used to counter balance a temperature dependent variation of an emitter-base current supplied by a first current source. This results in a substantially zero temperature coefficient (TC) source current being provided to the temperature sensor and rendering the voltage difference due to the resistance in measurement pathway substantially constant. The constant voltage difference can be factored in a measurement algorithm improving the accuracy of the temperature measurement.

Figure 1:
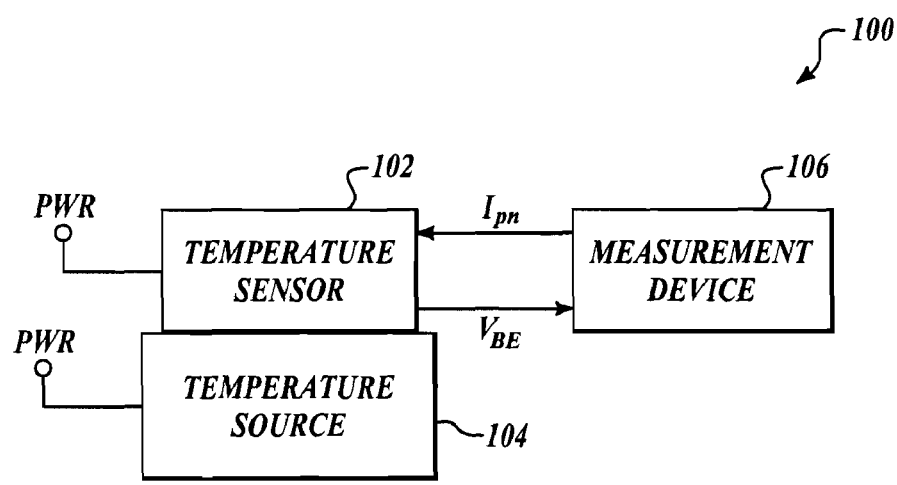
FIG. 1 illustrates a block diagram of a typical environment in which one embodiment of a temperature sensor may be implemented.

FIG. 1 illustrates block diagram 100 of a typical environment in which one embodiment of temperature sensor 102 may be implemented. Block diagram 100 includes temperature sensor 102, temperature source 104, and measurement device 106. Temperature sensor 102 is a device arranged to measure a temperature of temperature source 104 and provide a junction voltage $V_{BE}$ to measurement device 106. Measurement device 106 is arranged to provide bias current $I_{pn}$ to temperature sensor 102 and determined the temperature employing a difference voltage $\Delta V_{BE}$. In one embodiment, temperature sensor 102 may be employed to measure the temperature of an integrated circuit.

Semiconductor junction devices are often used as temperature sensors for integrated circuit devices. When such a device is biased at a given current and a junction temperature varies, a voltage across the junction device shows a variation with temperature. A voltage versus temperature curve of the junction device may have a negative coefficient, with the voltage substantially equal to a bandgap voltage of silicon at zero absolute temperature.

As noted, measurements employing such a junction device may be subject to process variation and non-linearity problems. For this reason a differential measurement technique may be used. The technique may be based on measuring a difference in the voltages of two junction devices operating at different current densities, measuring voltages of the same junction device at two different current values, and the like. In one embodiment, difference voltage $\Delta V_{BE}$ may be determined as a digital value during digitization of a first value of $V_{BE}$ ($V_{BE1}$) and a second value of $V_{BE}$ ($V_{BE2}$).

The difference voltage $\Delta V_{BE}$ may be a relatively small voltage (typically a fraction of a millivolt/Kelvin), so it may be amplified to create a more convenient temperature coefficient (such as 10 mV/K) at a measurement device output. This technique may be used to produce silicon temperature sensors with output voltages or currents proportional to absolute temperature. However, the invention is not so limited. Circuits and methods described herein may be applied to other types of temperature measurements as well.

In one embodiment, temperature sensor 102 may be a junction diode used to detect a temperature of temperature source 104, which may be an integrated circuit. Typically temperature sensor 102 may be formed from a p-type region that is introduced into an n-type substrate which, along with an encapsulating material, is mounted on a metal frame. Accordingly, temperature sensor 102 may be placed in close proximity of temperature source 104, but separated by a region that may be characterized as being at ambient temperature. Also, temperature sensor 102 may be placed within temperature source 104.

As devices with higher clock speeds are developed, an accuracy with which the temperature of a device can be determined becomes more important. This is because such devices typically generate more heat than lower clock speed devices. It may be important to closely monitor the heat generated, and hence the temperature, to prevent device failures. Accordingly, knowing an actual device temperature during operation provides assistance in assessing a reliability and a performance of a device.

For measuring the actual device temperature as opposed to the ambient temperature near the device such as temperature source 104, temperature sensor 102 may be placed directly onto a substrate containing the temperature source device. Because temperature sensor 102 and temperature source 104 have separate but attached substrates, electrons may be injected from one to another generating noise that may affect a temperature measurement. Therefore, various techniques including, amplification, filtering, noise cancellation, and the like, may be implemented in measurement device 106 for accurate measurement of the temperature of temperature source 104. In one embodiment, one or more of the signal conditioning techniques listed above, may be implemented in temperature sensor 102, while others may be implemented in measurement device 106.

In one embodiment, measurement device 106 may include, or provide input to, an analog to digital converter (ADC) (not shown) whose output is coupled to a logic circuit (not shown). The logic circuit may convert the digitized measurement of the temperature voltage into a format that can be displayed by digitized temperature display. The display may include numerical displays, colors, pictures, graphics, bar graphs, sounds, status bits, status pins, interfaces, and the like, as a representation of the digitized temperature for the remotely located temperature source.

FIG. 1 shows a particular arrangement of inputs and outputs of the various components such as temperature sensor 102, measurement device 106, and the like. Other arrangements of the components may be implemented without departing from the scope and spirit of the present invention.

Figure 2:
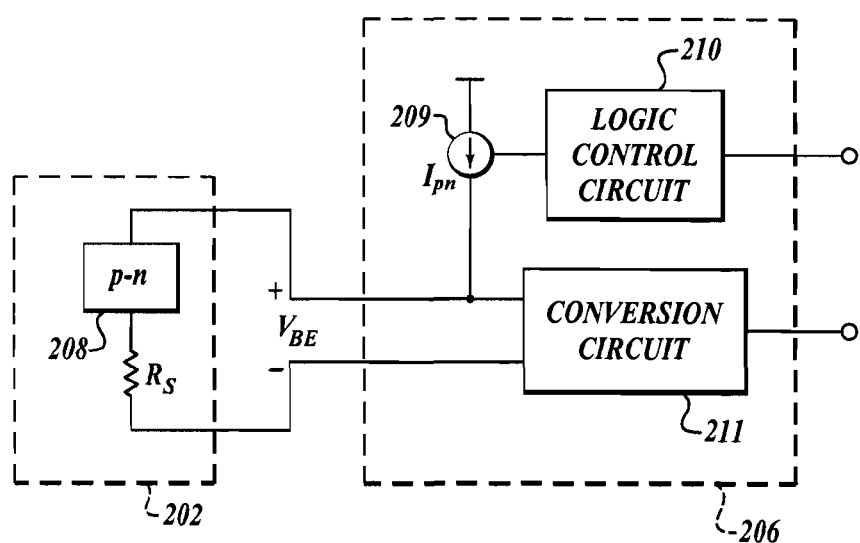
FIG. 2 schematically illustrates one embodiment of an exemplary circuit for a temperature sensor.

FIG. 2 schematically illustrates one embodiment of an exemplary circuit for temperature sensor 202 and measurement device 206, which represent temperature sensor 102 and measurement device 106 of FIG. 1. Temperature sensor 202 may include p-n junction device 208, and resistor $R_S$. Measurement device 206 may include current source 209, logic control circuit 210, and conversion circuit 211. Conversion circuit 211 may include additional logic control circuits, a low-pass filter, and an analog-to-digital converter (ADC) (not shown). In one embodiment, p-n junction device 208 may include at least one of a junction diode and a junction transistor. If a transistor is used as p-n junction device 208, the transistor may be arranged to operate in a base-emitter mode. Resistor $R_S$ may represent total parasitic resistance in a path of junction voltage $V_{pn}$.

While p-n junction device 208 may include any type of junction circuit, commonly vertical p-n-p silicon based transistors are used for temperature sensing purposes. Therefore, FIG. 2 will be described using an example of a transistor operating in base-emitter mode. Accordingly, current $I_{pn}$ of current source 209 will be referred to as $I_{BE}$ and junction voltage $V_{pn}$ will be referred to as $V_{BE}$.

Collector current $I_C$ (or diode current $I_D$ of a p-n junction diode) has an exponential relationship with base-emitter voltage $V_{BE}$, which may be expressed as $$I_D = I_C = I_{Sat} * \left(e^{\left(\frac{V_{BE} - I_E * R_S}{n * V_T}\right)} - 1\right), \text{ where:} \quad (1)$$

$I_{Sat}$ is a saturation current of the p-n junction, which approximately doubles for every 5 Kelvin increase in temperature;

n is an coefficient, which is substantially near one;

$V_T$ is thermal voltage that may be expressed as $$\frac{k * T}{q},$$

, with k: the Boltzmann constant ($\approx 1.38*10^{-23}$ J/K), T the temperature in Kelvin, and q the electric charge ($\approx 1.6*10^{-19}$ C);

$R_S$ is a resistance across the p-n junction; and $I_E$ is an emitter current through the p-n junction.

A relation between collector current $I_C$ and emitter current $I_E$ may be expressed as:

$$\frac{I_{C1}}{I_{C2}} \approx \frac{I_{E1}}{I_{E2}},$$

where $I_{C1}$ and $I_{C2}$ are first and second collector current through a p-n junction, and $I_{E1}$ and $I_{E2}$ are corresponding emitter currents through the same p-n junction.

From equation (1) above, $V_{BE}$ may be expressed as:

$$V_{BE} = (n * V_T) * \ln\left(\frac{I_C}{I_{Sat}}\right) + I_E * R_S. \quad (2)$$

As described previously, difference voltage $\Delta V_{BE}$ may be determined from a difference of two $V_{BE}$ values for two given $I_{BE}$ values. Accordingly, $\Delta V_{BE}$ may be expressed as:

$$\Delta V_{BE} = V_{BE2} - V_{BE1} = (nV_T) * \ln\left(\frac{I_{C2}}{I_{C1}}\right) + (I_{E2} - I_{E1}) * R_S \quad (3)$$

$$= \frac{n*k}{q} * T * \ln(A) + \Delta I_E(T) * R_S,$$

where $I_{C1}$ and $I_{C2}$ are two junction currents provided by a known current source, and A is a constant parameter such that $$A = \frac{I_{C2}(T_2)}{I_{C1}(T_2)} \approx \frac{I_{C2}(T_1)}{I_{C1}(T_1)}.$$

Moreover, a change of the temperature of a temperature source, such as an integrated circuit, may be determined by comparing $\Delta V_{BE}$ at two different temperatures $T_1$ and $T_2$, yielding $V_{delta}$ as a function of temperature:

$$V_{delta} = \Delta V_{BE}(T_2) - \Delta V_{BE}(T_1) \quad (4)$$

$$= \left(\frac{n*k}{q}\right) * \left(T_2 * \ln\left(\frac{I_{C2}(T_2)}{I_{C1}(T_2)}\right) - T_1 * \ln\left(\frac{I_{C2}(T_2)}{I_{C1}(T_2)}\right)\right) +$$

$$((I_{E2}(T_2) - I_{E1}(T_2)) - (I_{E2}(T_1) - I_{E1}(T_1))) * R_S.$$

If relatively good matching techniques are implemented in the temperature sensing circuitry, a ratio of $I_{C2}$ to $I_{C1}$ at $T_2$ and $T_1$ may be substantially equal and can be represented by the constant parameter A described above. Accordingly, equation (4) may be simplified as:

$$V_{delta} = \left(\frac{n*k}{q}\right) * (T_2 - T_1) * \ln(A) + (\Delta I_E(T_2) - \Delta I_E(T_1)) * R_S. \quad (5)$$

As equation (5) shows, $V_{delta}$ is linearly dependent on the temperature difference $(T_2 - T_1)$, except for the second term in the equation $(\Delta I_E(T_2) - \Delta I_E(T_1)) * R_S$, which represents an effect of the series parasitic resistance $R_S$ on the measurement. As mentioned before, if a current flowing through $R_S$ is temperature dependent, the second term may introduce an error that varies with temperature into the measurement. On the other hand, if the current flowing through $R_S$ can be made substantially zero TC, the second term of the equation may be substantially constant, enabling a measurement algorithm to compensate for it.

Equations (1)–(5) demonstrate how a temperature difference and an absolute temperature (see equations (2) and (3)) can be determined employing Shockley diode equation and a temperature dependent error factor may be converted to a substantially constant parameter that may be eliminated by the measurement algorithm. While this temperature determination may be performed using analog values, in one embodiment, $V_{BE}$ measurements may be digitized and the calculations performed on digital values.

As shown in FIG. 2, temperature sensor 202 includes p-n junction device 208, which may be implemented as a junction diode, a junction transistor in base-emitter mode, and the like. Resistor $R_S$ represents a series parasitic resistance that may exist in the measurement path due to a packaging of components, a layout, and the like. Measurement device 206 includes current source 209, which is arranged to provide bias current $I_{pn}$, or $I_C$ in case of a base-emitter mode transistor. In one embodiment, current source 209 may be programmable such that the bias current may be varied between $I_{C1}$ and $I_{C2}$. In another embodiment, current source 209 may be controlled by logic control circuit 210. Junction voltage $V_{pn}$, or $V_{BE}$ may be measured across the base-emitter junction and provided to conversion circuit 211 of measurement device 206. Conversion circuit 211 may receive values of $V_{BE}$ for different bias currents, such as $V_{BE1}$ and $V_{BE2}$, and digitize them.

Accordingly, a digital value representing the temperature may be determined during the digitization process employing equation (3), instead of determining an analog $\Delta V_{BE}$. In a further embodiment, $V_{BE1}$ and $V_{BE2}$ may be first digitized, then a calculation according to equation (3) performed to determine the digital value representing the temperature. In a yet further embodiment, an analog calculation may be performed on $V_{BE1}$ and $V_{BE2}$ in conversion circuit 211 determining $\Delta V_{BE}$, which may then be converted to the digital value representing the temperature.

The digital value representing the temperature may be used by other logic circuitry for purposes like control, display, feedback, and the like. For example, the digital value, may be converted into a representation of the temperature, which may be displayed or employed by other devices to control the temperature of the source device such as an integrated circuit. Moreover, substantially the same process can be employed to determine the temperature of a temperature source that is disposed locally, i.e., in the same integrated circuit as the components employed to measure temperature.

Noise may couple to temperature sensor 202, such as electrons from a first substrate where the temperature source device resides penetrating a second substrate where the temperature sensor resides. A low-pass filter may be employed in conversion circuit 211 to compensate for such noise, especially when the measurement voltages are relatively small.

Additionally, temperature sensor 202 and measurement circuit 206 may be arranged so that an interface external to the integrated circuit can be employed to configure an operation of a control logic circuit and values of temperature limits. The interface can also be configured to provide a digitized value that represents a relatively accurate temperature of the remotely located temperature source.

While one aspect of the present invention is described above referring to measurements at $T_1$ and $T_2$, in an actual operation, the measurements may be performed during a first time interval and during a second time interval. The first time interval and the second time interval may be selected such that they are sufficiently long to enable the substantially zero TC current source to apply the zero TC current and the conversion circuit to measure and digitize the junction voltage. At the same time the first time interval and the second time interval may be sufficiently short such that a change in temperature during each time interval is substantially negligible. Accordingly, measurements made during the first time interval and during the second time interval correspond to temperatures $T_1$ and $T_2$, respectively.

FIG. 2 shows a particular arrangement of inputs and outputs of the various components. In one embodiment, all of the components of temperature sensor 202 and measurement circuit 206 may be included in the same chip. Alternatively, one or more of the components may be off-chip.

Figure 3:
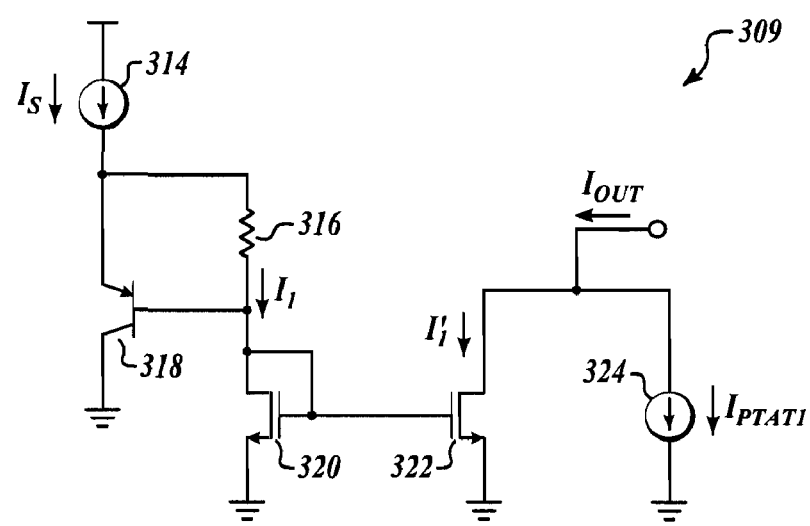
FIG. 3 schematically illustrates a zero temperature coefficient (TC) current source circuit that may be implemented in a temperature measurement device, according to one embodiment of the present invention.

FIG. 3 schematically illustrates zero temperature coefficient (TC) current source circuit 309 that may be implemented in a temperature measurement device, according to one embodiment of the present invention. Zero TC current source 309 may be one embodiment of current source 209 of FIG. 2. Zero TC current source circuit 309 includes current source 314, Proportional To Absolute Temperature (PTAT) current source 324, junction transistor 318, resistor 316, and transistors 320 and 322.

Current source 314 is arranged to provide emitter current Is to junction transistor 318. PTAT current source 324 provides adjustable current $I_{PTAT1}$, which increases in proportion to temperature. Current $I_1$ flows between the emitter and a base of junction transistor 318 through resistor 316. Transistors 320 and 322 are arranged to operate as a current mirror providing $I_1'$ ($I_1 \approx I_1'$) to a path parallel to $I_{PTAT1}$ such that a zero TC current $I_{OUT}$ is substantially equal to a sum of $I_1$ and $I_{PTAT1}$.

Base-emitter voltage $V_{BE}$ of junction transistor 318 decreases with rising temperature (see equation (2)), causing $I_1$ to decrease as well. Accordingly, $I_1$ is inverse proportional to the temperature. A change of $I_1$ in inverse proportion to the temperature is reflected through the current mirror comprising transistors 320 and 322 in $I_1'$. Because $I_{OUT}$ is substantially equal to a sum of $I_{PTAT1}$ and $I_1$ ($I_1'$), junction transistor 318 and resistor 316 may be pre-selected such that a decrease in $I_1$ compensates for an increase in $I_{PTAT1}$ with rising temperature. This may result in $I_{OUT}$ being substantially temperature independent (zero TC). An opposite effect may be observed when temperature decreases with $I_{OUT}$ remaining substantially constant. In another embodiment, a ratio of p-n junction areas of transistors 320 and 322 may be pre-selected such that $I_1'$ is a multiple of $I_1$, and the ratio of $I_1'/I_1$ may be determined to enable $I_{OUT}$ to be substantially zero TC.

When the circuit is in operation, $I_{PTAT1}$ is set to a first value and to a second value such that $I_{OUT}$ may be provided to the temperature sensor (not shown) at two different values. The measurement circuit (not shown) may measure two values of the temperature sensor's junction voltage $V_{BE1}$ and $V_{BE2}$ and determine a digital value representing a temperature employing equation (5).

Substantially zero TC $I_{OUT}$ may be provided to a temperature sense transistor, such as an embodiment of p-n junction 208 of FIG. 2, so that the second term of equation (5) is substantially temperature independent, and the temperature may be determined based on the junction voltage of the temperature sense transistor for different values of zero TC current $I_{OUT}$.

Figure 4:
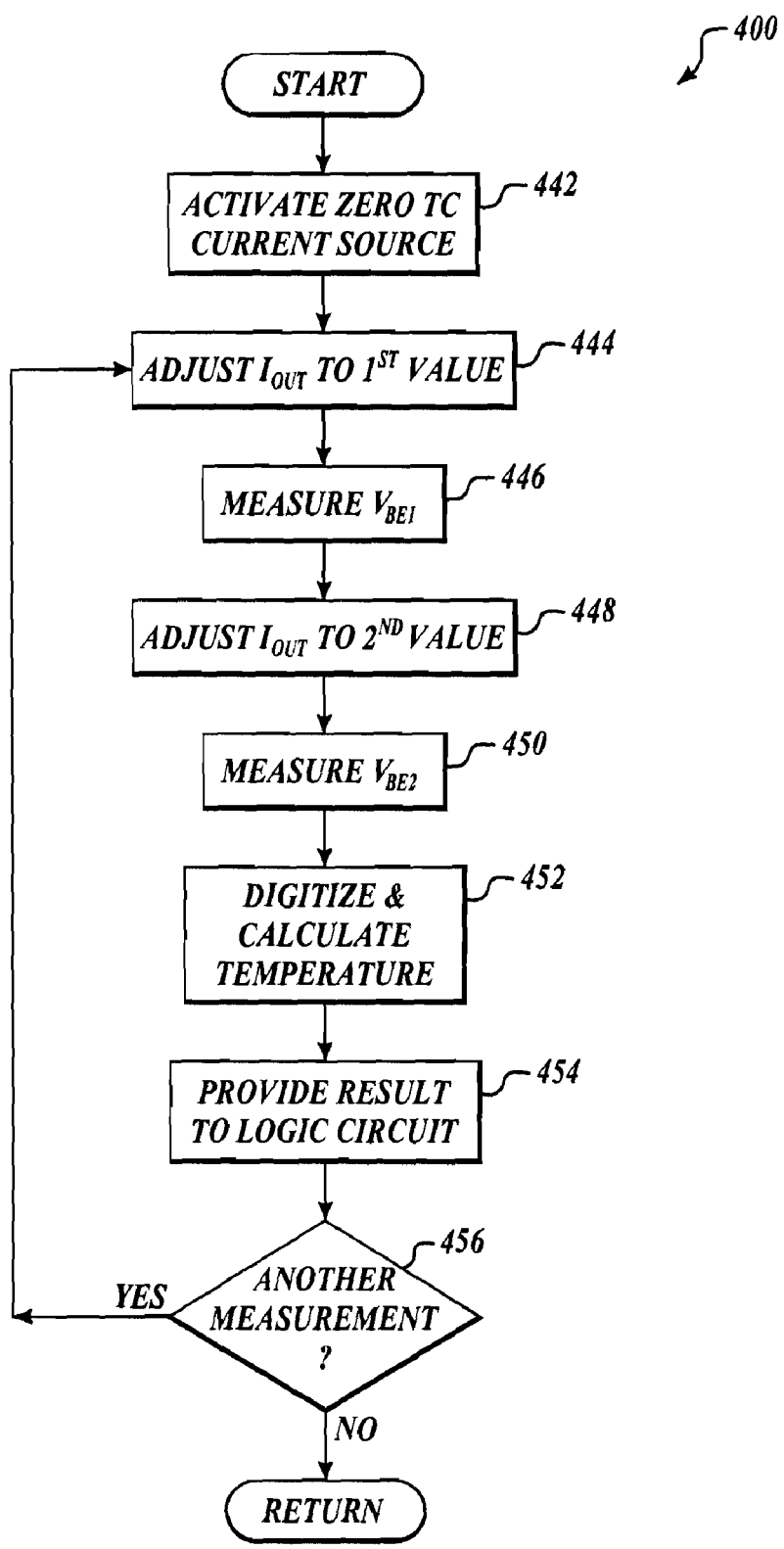
FIG. 4 illustrates a flow chart of an embodiment of a process determining a temperature of a remotely located temperature source employing a zero TC current source.

FIG. 4 illustrates a flow chart generally showing process 400 for determining a temperature of a remotely located temperature source employing a zero TC current source. Process 400 may, for example, be implemented in measurement device 106 of FIG. 1.

As shown in FIG. 4, process 400 begins after a start block, at block 442, where a substantially zero TC current source is activated providing temperature sense circuit with supply current. The zero TC current source may be implemented as described in FIG. 3. In one embodiment, a junction transistor operating in common base-emitter mode may be employed as a temperature sensing element of the temperature sensor circuit. Processing then proceeds to block 444.

At block 444, zero TC current $I_{OUT}$ may be set to a pre-determined first value. As described previously in conjunction with FIG. 2, two values of zero TC current may be employed to determined a temperature based on a difference of a first and a second value of $V_{BE}$ corresponding to the first and a second value of $I_{OUT}$. The current source providing zero TC current may be controlled by on-chip logic circuitry, an external device, a controller, and the like. Processing then proceeds to block 446.

At block 446, the first value of base-emitter voltage $V_{BE1}$ is measured. In one embodiment, the value of $V_{BE1}$ may be provided to a measurement device after each measurement. In another embodiment, a predetermined number of measurement results may be first stored in a storage device, and subsequently forwarded to the measurement device. A granularity of the voltage measurement may be determined based on a pre-selected accuracy of the temperature measurement. Processing then proceeds to block 448.

At block 448 and subsequently at block 450, the second value for $I_{OUT}$ is set, and the second value of base-emitter voltage $V_{BE2}$ measured. First and second values of base-emitter voltage $V_{BE1}$ and $V_{BE2}$ may then be digitized and a digital value representing the temperature determined employing equation (3) at block 452. As described previously, $V_{BE1}$ and $V_{BE2}$ may be first digitized, then a calculation according to equation (3) performed to determine the digital value representing the temperature. Processing then proceeds to block 454.

At block 454, the digital value representing the temperature may be provided to a logic circuit. In one embodiment, the logic circuit may be arranged so that an interface external to the integrated circuit can be employed to configure an operation of a controller circuit and values of temperature limits. The interface can also be configured to provide a digitized value that represents a relatively accurate temperature of the remotely located temperature source.

In another embodiment, the logic circuit may convert the digitized measurement of the temperature into a format that can be displayed by digitized temperature display. The display may include numerical displays, colors, pictures, graphics, bar graphs, sounds, status bits, status pins, interfaces, and the like, as a representation of the digitized temperature for the remotely located temperature source. Processing then proceeds to decision block 456.

At block 456 a decision is made whether another measurement will be performed or not. If the decision is affirmative, processing returns to block 444 and restarts another loop with setting a first value of $I_{OUT}$. In one embodiment, the temperature sensor circuit may be arranged to perform periodic temperature measurements. In another embodiment, the logic circuit may determine a frequency of the temperature measurements. If the decision at block 456 is negative, processing returns to a calling process to perform other actions.

Moreover, each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

The above specification, examples and data provide a description of the manufacture and use of the composition of the invention. Since many embodiments of the invention can be made without departing from the spirit and scope of the invention, the invention also resides in the claims hereinafter appended.

We claim:

1. A device for measuring a temperature of a source device using a temperature sensor that includes a p-n junction, the device comprising:
   a current supply circuit that is arranged to provide a first substantially zero Temperature Coefficient (TC) current and a second substantially zero TC current to the p-n junction, wherein the first substantially zero TC current is different from the second substantially zero TC current; and
   a conversion circuit that is arranged to measure a first junction voltage and a second junction voltage, and to determine the temperature based on the first junction voltage and the second junction voltage, wherein the first junction voltage and the second junction voltage are each measured across the p-n junction.

2. The device of claim 1, further comprising:
   a controller circuit that is configured to control the current supply circuit such that the current supply circuit provides the first substantially zero TC current to the p-n junction during the first time interval, and the current supply circuit provides the second substantially zero TC current to the p-n junction during the second time interval.

3. The device of claim 1, wherein the source device is an integrated circuit, and wherein the device for measuring the temperature is in the same integrated circuit as the temperature source device.

4. The device of claim 1, wherein the temperature sensor comprises at least one of a dual diode junction device and a junction transistor.

5. The device of claim 1, wherein the conversion circuit is further arranged to:
   convert the first junction voltage to a first digital value;
   convert the second junction voltage to a second digital value; and
   determine a digital value representing the temperature based on a difference between the first digital value and the second digital value.

6. The device of claim 5, wherein the conversion circuit comprises:
   an analog-to-digital converter that is arranged to convert the first and the second junction voltages to the first and second digital values, and to perform calculations to determine the digital value representing the temperature.

7. The device of claim 6, wherein the conversion circuit further comprises:
   a logic circuit that is arranged to employ the digital value representing the temperature to perform at least one of the actions of:
   displaying a representation of the temperature on a display device; and
   providing input to another logic circuit for controlling the measured temperature of the source device.

8. The device of claim 1, wherein the conversion circuit is further arranged to provide the first junction voltage during a first time interval and the second junction voltage during a second time interval.

9. The device of claim 8, wherein the first time interval is sufficiently long that a bias current is applied and a junction voltage is measured during the first time interval, and sufficiently short that a change in a temperature of the source device during the first time interval is substantially negligible.

10. The device of claim 9, wherein the second time interval is sufficiently long that the bias current is applied and the junction voltage is measured during the second time interval, and sufficiently short that a change in a temperature of the source device during the second time interval is substantially negligible.

11. A device for measuring a temperature of a temperature source device using a temperature sensor, comprising:
   a substantially zero TC current source that is arranged to provide a plurality of bias currents to a p-n junction of the temperature sensor such that each of the plurality of bias currents is substantially independent of the temperature; and
   a measurement circuit that is arranged to determine a digital value representing the temperature based on a plurality of junction voltages in response to the plurality of bias currents, wherein each of the plurality of junction voltages is measured across the p-n junction of the temperature sensor.

12. The device of claim 11, wherein the measurement circuit is further arranged to:
   measure the plurality of junction voltages;
   determine a difference voltage based on the measured plurality of junction voltages;
   convert the difference voltage to a digital value; and
   determine the temperature based on the digital value.

13. The device of claim 11, wherein the plurality of bias currents comprises a first bias current and a second bias current, and wherein the plurality of junction voltages includes:
   a first junction voltage in response to the first bias current; and
   a second junction voltage in response to the second bias current.

14. The device of claim 13, wherein the measurement circuit is further arranged to determine:
   a first digital value based on the first junction voltage;
   a second digital value based on the second junction voltage;
   a difference value based, in part, on a difference between the first digital value and the second digital value; and
   a digital value representing a temperature based, in part, on the first difference value.

* * * * *